United States Patent Office 3,335,316
Patented Aug. 8, 1967

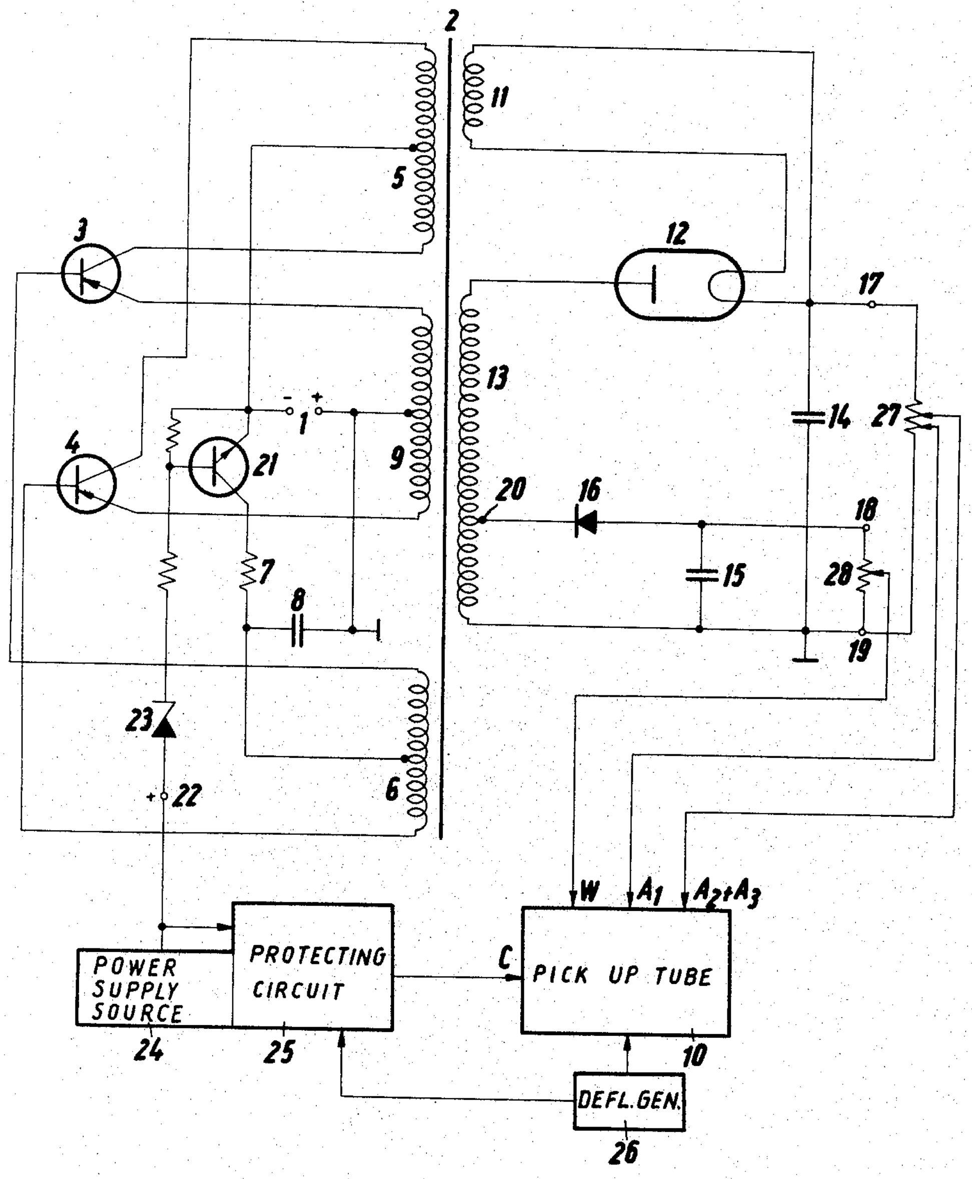
Inventor:
Hans-Dieter Schneider
by Richard J. Striker
attorney

3,335,316
INVERTER UNIT WITH AUTOMATIC OUTPUT INTERRUPTION UPON ASSOCIATED EQUIPMENT FAILURE
Hans-Dieter Schneider, Gross-Gerau, Germany, assignor to Fernseh G.m.b.H., Darmstadt, Germany
Filed May 19, 1964, Ser. No. 368,553
Claims priority, application Germany, May 30, 1963, F 39,880
4 Claims. (Cl. 315—20)

ABSTRACT OF THE DISCLOSURE

A transistor oscillating inverter unit for supplying the high voltage in a television set, having two transistors in push-pull, has a switching transistor in the base circuit of the push-pull transistors. The base of the switching transistor is connected by a Zener diode to an independent power supply source furnishing the power for a protecting circuit for the pick-up tube. Under normal operating conditions the Zener breakdown voltage of the Zener diode is exceeded and the switching transistor conducts, in turn allowing the high voltage to appear. Upon failure of the independent power supply source the Zener diode no longer conducts, causing the switching transistor to open. This in turn interrupts the high voltage to the tube preventing damage to it.

The present invention relates to a transistor oscillator unit which is especially well suited for use in a power supply for television cathode-ray tubes for converting a low D.C. voltage into a higher D.C. voltage.

In communication equipments, for example in television cameras, sometimes relatively high D.C. voltages are required, which are obtained from low D.C. voltages by employing transistor converter circuits known per se. The principle of these converter circuits consists in periodically interrupting the low D.C. voltages by means of transistors, generating high voltages by transforming the interrupted voltages and rectifying the resulting waveform. In equipments of this kind with several supply sources it has been found advantageous, if the required voltages are related to one another. In television cameras, for example, in order to prevent the target from being destroyed because of the high acceleration of the undeflected beam electrons by the high-tension voltage, it is usual to suppress the electron beam current of the pickup tube, when a deflection voltage fails to appear, for example because of the breakdown of a circuit element. When the deflection generator fails to operate, it is possible to apply a blocking voltage (about −60 v.) to the cathode of the pickup tube. When, however, the blocking voltage also is absent, so that the beam current can no longer be suppressed when the deflection generator fails, the target will be destroyed.

It is therefore a main object of this invention to provide a circuit arrangement which is comparatively simple in its structure and will overcome the aforementioned disadvantage.

It is another object of this invention to provide a novel transistor oscillator which is controlled by a voltage derived from the power supply for a protecting circuit which is independent of the output voltage of the transistor oscillator.

It is still another object of this invention to provide a novel transistor oscillator which is controlled by a voltage derived from the power supply for a protecting circuit serving to suppress the electron beam current of a television cathode-ray tube if the deflection voltage fails to appear.

It is a further object of this invention to provide a novel transistor oscillator, of which the oscillation is suppressed when the voltage of the power supply for the protecting circuit fails to appear.

In order that the invention may be well understood and readily carried into effect, it will now be described with reference to the accompanying drawing, given by way of example. In the drawing there is represented a transistor oscillator supplied from the battery 1 with 12 v. for generating the positive voltage of 1500 v. necessary for the operation of a television pickup tube and an additional negative auxiliary voltage of 500 v. The transistor oscillator comprises the transformer 2 and two push-pull connected transistors 3 and 4 (A.C. 124).

The primary side of the transformer 2 comprises three center tapped windings having their ends connected to respective electrodes of the two transistors 3 and 4. The ends of the winding 5 are connected to the collectors of transistors 3 and 4 and the center tap to the negative terminal of the battery 1. The positive feedback winding 6 has both its ends connected to the base electrodes of the two transistors and its center tap to the negative terminal of battery 1 by way of a time constant member consisting of the resistor 7 and the condenser 8. The emitters of the transistors 3 and 4 are connected to the ends of the negative feedback winding 9, while the center tap of said winding is connected to the positive terminal of the battery 1.

The resistor 7 and the condenser 8 are responsible for the frequency of the oscillator. When the operating voltage is switched on, current starts to flow through the transistors 3, 4 causing by reason of asymmetries and feed-back the generation of a nearly rectangular waveform. The voltages induced in the primary windings 5, 6 and 9 are so directed that the transistor 4 is blocked, when the transistor 3 passes current, and vice versa. The changing of the working phase of the transistors 3, 4 depends in this case upon the time constant of the member 7, 8 and the inductance of the transformer 2. This function of a push-pull blocking oscillator is known per se.

When the value of resistor 7 is made very high, both transistors 3, 4 are blocked, so that oscillation is suppressed. It follows that by closing and opening respectively the circuit including resistor 7, the high-tension generator may be switched on and off respectively.

As explained in the preceding description it is advantageous to protect the target of the pickup tube 10 against destruction by suppressing the electron beam current by a blocking voltage switched on when the deflection current is absent. In accordance with the invention it is intended to effect the switching off of the high-tension voltage in dependence of a failure of the blocking voltage itself, said blocking voltage being generated by the protecting circuit 25. The importance of this measure results from the fact that there is an equal probability for a failure in the protecting circuit itself as in the deflection circuit. In practice, the emitter-collector path of an auxiliary transistor 21 (OC141) is connected between the negative terminal of the battery 1 and the resistor 7, the current required for switching the transistor being only a fraction of the total operating current of the battery 1. Furthermore, the terminal 22 is coupled to the power supply source 24 of the protecting circuit 25 serving to switch on the blocking voltage for the beam current to the cathode C of the pickup tube 10, if the deflection current produced by the deflection generator 26 does not occur.

Under normal operating conditions of the pickup tube 10, that is, when the deflection current and therefore the normal working potential for the cathode C of the pickup tube 10 are present, a base current is flowing through transistor 21. Thus a current may also flow through the circuits formed by the resistor 7 and the base-emitter paths of the transistors 3, 4, so that the normal high-tension voltage is produced.

If, on the other hand, the voltage of the power supply 24 for the protecting circuit 25 fails to appear, the transistor 21 is blocked, thereby suppressing simultaneously the base current of transistors 3, 4, whereby the oscillation is also suppressed. This results in a breakdown of the high-tension voltage.

In addition, other loads may also be connected to the terminal 22 of the power supply source 24. If by way of example the fuse of the power supply source 24 fails, the terminal 22 would be connected by way of the loads to reference potential, to which there is also applied the positive terminal of battery 1. In this case, a base current would thus continue to flow through transistor 21, that is, the transistor oscillator would continue to operate, even with no voltage of the power supply source 24 present. Therefore, in the base circuit of transistor 21 there is provided a Zener diode 23, by the threshold value of which this disadvantage is avoided. The transistor 21 is therefore blocked whenever the voltage between the negative terminal of battery 1 and terminal 22 is lower than the Zener voltage of the Zener diode 23.

The secondary side of the transformer 2 comprises a heater winding 11 for the heating current supply of the rectifier tube 12 (Ey51) and a tapped high-tension winding 13 for generating the high-tension to be rectified. One end of the winding 13 is connected to the anode of the rectifier tube 12 and the other end to terminal 19 (reference potential). To the tap 20 there is connected a semiconductor diode 16 (SSi3) being so poled that it passes current in a direction contrary to that of the rectifier 12. This type of circuit is advantageous, because it produces a certain symmetry in the loading of the primary side transistors. Then the desired positive voltage of for example 1500 v. and the additive negative auxiliary voltage of for example 500 v. can be taken off between the terminals 17, 19 and 18, 19. The voltages at the taps of the resistor 27 are applied to the anodes $A_1$, $A_2$, $A_3$ and the voltage at the tap of resistor 28 is applied to the Wehnelt electrode W of the cathode-ray tube 10.

What is claimed and desired to be secured by Letters Patent is:

1. Transistor oscillator unit for converting a D.C. voltage into an A.C. voltage, comprising, in combination, a pair of transistors connected in push-pull relation, a transformer with a plurality of primary windings and a secondary winding connected to a load circuit, the collectors of said pair of transistors being connected to the ends of a first primary winding and the base electrodes of said pair of transistors to the ends of a second primary winding of said transformer, each of said primary windings being provided with a center tap, a time constant member connected between the center taps of said first and said second primary winding, a D.C. voltage source being connected between the center tap of the first primary winding and the emitters of said pair of transistors, an auxiliary switching transistor of opposite conductivity type being connected in series with said time constant member, with its emitter connected to the center tap of said first primary winding and with its collector to the center tap of said second primary winding, a power supply source delivering a switching voltage independent of said load circuit, said power supply source being connected to a protecting circuit serving to put a member of said load circuit in an inoperative state in case of emergency, said power supply source being coupled to the base-emitter circuit of said auxiliary transistor, so that under normal operating conditions said auxiliary transistor is driven conductively, but in case of a failure of said switching voltage said auxiliary transistor is blocked and thereby the oscillation interrupted.

2. Transistor oscillator unit for converting a D.C. voltage into an A.C. voltage, comprising, in combination, a pair of transistors connected in push-pull relation, a transformer with a plurality of primary windings and a secondary winding connected to a load circuit, the collectors of said pair of transistors being connected to the ends of a first primary winding and the base electrodes of said pair of transistors to the ends of a second primary winding of said transformer, each of said primary windings being provided with a center tap, a time constant member connected between the center taps of said first and said second primary winding, a D.C. voltage source being connected between the center tap of the first primary winding and the emitters of said pair of transistors, an auxiliary switching transistor of opposite conductivity type being connected in series with said time constant member, with its emitter connected to the center tap of said first primary winding and with its collector to the center tap of said second primary winding, a power supply source delivering a switching voltage independent of said load circuit, said power supply being connected to a protecting circuit serving to put a member of the load circuit in an inoperative state in case of emergency, said power supply source being coupled to the base-emitter circuit of said auxiliary transistor, a member with a threshold value characteristic being connected between base electrode of said auxiliary transistor and said power supply source, said threshold value corresponding to a higher voltage than the voltage of said D.C. voltage source.

3. Transistor oscillator unit according to claim 2, wherein as said threshold member is used a Zener diode.

4. Transistor oscillator unit for generating a high-tension D.C. voltage for the supply of television cathode-ray tubes, comprising, in combination, a pair of transistors connected in push-pull relation, a transformer with a plurality of primary windings and a secondary winding connected to a rectifier for producing said high-tension D.C. voltage, the collectors of said pair of transistors being connected to the ends of a first primary winding and the base electrodes of said pair of transistors to the ends of a second primary winding of said transformer, each of said primary windings being provided with a center tap, a time constant member connected between the center taps of said first and said second primary winding, a D.C. voltage source being connected between the center tap of said first primary winding and the emitters of said pair of transistors, an auxiliary switching transistor of opposite conductivity type being connected in series with said time constant member, with its emitter connected to the center tap of said first primary winding and with its collector to the center tap of said second primary winding, a power supply source for furnishing a switching voltage, said power supply source being connected to a protecting circuit serving to suppress the electron beam current of said television cathode-ray tube in case of a failure of the deflection voltage, said switching voltage being independent of the output voltage of said transistor oscillator, so that under normal operating conditions said auxiliary transistor is driven conductively, but in case of a failure of said switching voltage said auxiliary transistor is blocked and thereby the oscillation interrupted.

References Cited

UNITED STATES PATENTS

| | | | |
|---|---|---|---|
| 2,222,426 | 11/1940 | White et al. | 315—20 |
| 2,959,745 | 11/1960 | Grieg | 331—113.1 |
| 3,017,559 | 1/1962 | Mallory | 321—2 |
| 3,151,287 | 9/1964 | Pintell | 321—2 X |

JOHN F. COUCH, *Primary Examiner.*

W. H. BEHA, *Assistant Examiner.*